US008843746B2

(12) United States Patent
Bleumer

(10) Patent No.: US 8,843,746 B2
(45) Date of Patent: Sep. 23, 2014

(54) METHOD AND ARRANGEMENT FOR SENDING AND RECEIVING CONFIDENTIAL ELECTRONIC MESSAGES IN A LEGALLY BINDING MANNER

(75) Inventor: Gerrit Bleumer, Schildow (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 139 days.

(21) Appl. No.: 13/270,583

(22) Filed: Oct. 11, 2011

(65) Prior Publication Data

US 2012/0089846 A1  Apr. 12, 2012

(30) Foreign Application Priority Data

Oct. 11, 2010  (DE) .......................... 10 2010 038 094

(51) Int. Cl.
*H04L 9/32* (2006.01)
*H04L 29/06* (2006.01)
*H04L 12/24* (2006.01)

(52) U.S. Cl.
CPC ............ *H04L 63/12* (2013.01); *H04L 63/0428* (2013.01); *H04L 41/0293* (2013.01); *H04L 9/32* (2013.01)
USPC ............ 713/168; 726/27; 726/28; 726/29

(58) Field of Classification Search
CPC ....... H04L 9/32; H04L 41/0293; H04L 63/12; H04L 63/0428
USPC ................... 713/168, 170; 726/27–29
See application file for complete search history.

(56) References Cited

U.S. PATENT DOCUMENTS

| 6,073,242 | A  | * | 6/2000 | Hardy et al. ................. 726/1 |
|---|---|---|---|---|
| 6,820,199 | B2 | * | 11/2004 | Wheeler et al. ............. 713/170 |
| 6,981,154 | B2 | * | 12/2005 | Wheeler et al. ............. 726/4 |
| 7,032,112 | B2 | * | 4/2006 | Wheeler et al. ............. 713/182 |
| 2,006,674 | A1 |   | 7/2006 | Gardner et al. |
| 7,089,421 | B2 | * | 8/2006 | Wheeler et al. ............. 713/176 |
| 2002/0042877 | A1 | * | 4/2002 | Wheeler et al. ............. 713/155 |
| 2002/0116608 | A1 | * | 8/2002 | Wheeler et al. ............. 713/155 |
| 2002/0120869 | A1 | * | 8/2002 | Engstrom ................. 713/201 |
| 2002/0181703 | A1 | * | 12/2002 | Logan et al. ................. 380/30 |
| 2005/0005123 | A1 | * | 1/2005 | Wheeler et al. ............. 713/176 |
| 2005/0044373 | A1 | * | 2/2005 | Wheeler et al. ............. 713/176 |
| 2006/0259761 | A1 | * | 11/2006 | Butenko ................. 713/153 |

(Continued)

OTHER PUBLICATIONS

"de-mail—sichere und rechtsverbindliche E-Mail," Stach, BMI, IT2, Eco. 16 (2008) pp. 1-24.

(Continued)

*Primary Examiner* — Eleni Shiferaw
*Assistant Examiner* — Jing Sims
(74) *Attorney, Agent, or Firm* — Schiff Hardin LLP

(57) ABSTRACT

In a method and arrangement for the secure transmission of at least one electronic message from a first terminal of a first user to at least one second terminal of a second user, the electronic message is generated by the first terminal. The electronic message is received by the second terminal. The electronic message is transmitted by an infrastructure for legally binding transmission of electronic messages from the first terminal to the second terminal. A first security module connected to the first terminal encrypts and/or signs the electronic message before the electronic message is transmitted by the infrastructure from the first terminal to the second terminal. A second security module, connected to the second terminal, decrypts the transmitted electronic message and/or verifies the signed electronic message.

17 Claims, 3 Drawing Sheets

(56) References Cited

U.S. PATENT DOCUMENTS

| | | | |
|---|---|---|---|
| 2007/0118735 A1* | 5/2007 | Cherrington et al. | 713/155 |
| 2007/0136572 A1* | 6/2007 | Chen et al. | 713/153 |
| 2007/0250904 A1* | 10/2007 | Waller | 726/1 |
| 2007/0288746 A1* | 12/2007 | Jones | 713/156 |
| 2008/0022111 A1* | 1/2008 | Dietl | 713/176 |
| 2008/0072068 A1* | 3/2008 | Wang et al. | 713/191 |
| 2009/0198997 A1 | 8/2009 | Yeap et al. | |
| 2011/0264905 A1* | 10/2011 | Ovsiannikov | 713/151 |
| 2012/0096277 A1* | 4/2012 | Perez Soria | 713/179 |

OTHER PUBLICATIONS

"VisualSec: A secure Message Delivery Scheme for Online Social Networks Based on Profile Images," Meng GE et al. Global Telecommunications Conference (2009), pp. 1-6.

* cited by examiner

METHOD AND ARRANGEMENT FOR SENDING AND RECEIVING CONFIDENTIAL ELECTRONIC MESSAGES IN A LEGALLY BINDING MANNER

BACKGROUND OF THE INVENTION

1. Field of the Invention

The invention relates to a method and an arrangement for the secure transmission of at least one electronic message from a first terminal of a first user (sender) to at least one second terminal of a second user (recipient).

2. Description of the Prior Art

For the legally binding transmission of electronic messages between two terminals, the E-POST system of the Deutsche Post AG and the DE-Mail System are known, which respectively are to enable the legally binding and confidential exchange of electronic documents between citizens, offices and companies via the Internet. The main objective of these systems is to be able to make deliveries via the Internet in a legally binding manner. Moreover, in the case of the DE-Mail System the data transmission between the Internet service provider of the sender and the Internet service provider of the recipient takes place in an encrypted manner. However, with these existing systems, unauthorized access to the data of the electronic message is possible at least at the provider itself or the providers themselves when the administrator rights are used accordingly.

Likewise, during the transmission of the electronic messages from the terminal of the sender to the provider and from the provider to the terminal of the recipient unauthorized access to the data of the electronic message can take place. Here, both the manipulation of the message and unauthorized access to the information of the message are considered as unauthorized access.

SUMMARY OF THE INVENTION

It is an object of the invention to ensure a secure transmission of an electronic message from a first terminal of a first user to at least one second terminal of a second user while using an infrastructure for the legally binding transmission of electronic messages without having to trust the operator of this infrastructure that he does neither spy out nor modify the sent message content.

In the inventive method and arrangement the security modules that are provided at the sender side and at the recipient side implement a cryptographic processing of the data of the electronic message so that an end-to-end encryption of the message between the first terminal and the second terminal is easily possible. As a result, unauthorized access to the information of the electronic message by the instances involved in the provision of the infrastructure for the legally binding transmission of electronic messages, such as an Internet service provider, and thus a manipulation of the electronic message are reliably prevented, even if the Internet service provider were to misuse its administrator rights for such purposes. Here, the first user is preferably the sender, and the second user is the recipient.

It is advantageous when the first security module is connected to the first terminal via a first data transmission connection and/or the second security module and the second terminal are connected via a second data transmission connection. Here, the first data transmission connection and/or the second data transmission connection can in particular be a transmission channel in a network, preferably a transmission channel in a wireless network. Alternatively, the first data transmission connection can be provided by a bus system of the first terminal and/or by a standardized application interface. Further, the second data transmission connection can be provided by a bus system of the second terminal and/or by a standardized application interface. The application interfaces can in particular be provided by software and are also referred to as API (application programming interface). As a bus system, in particular an internal bus system of the first terminal, such as a PCI bus, a PCI Express bus, an ISA bus, a universal serial bus or a suitable other data bus can be used.

By way of the indicated connection options between the security module and the terminal, different designs of the security module can be provided, in particular it can be provided as a separate terminal, as a unit of the terminal or as a software module executed by the terminal.

In an embodiment of the invention, the electronic message is transmitted by means of the infrastructure for the legally binding transmission of electronic messages from the first terminal to a provider and the message is transmitted from the provider to the second terminal. Alternatively or additionally, the electronic message transmitted from the first terminal to the provider can be encrypted by the provider. This provider is a first provider. The encrypted electronic message can then be transmitted from the first provider to a second provider. Subsequently, the message is decrypted by the second provider and transmitted to the second terminal. As a result thereof, an encryption of the electronic message as required according to the infrastructure for the legally binding transmission of electronic messages takes place during its transmission between two providers.

Preferably, the infrastructure for legally binding electronic messages comprises at least one, preferably all of the following functions and services:

a registration service for the registration of new users, and thus an establishment of a first identity of the registered user, an authentication service for the authentication of identities of already registered users, wherein the authentication of an identity of a user can only be successful after the user's registration, a sending service for electronic messages to be sent from an identity of the registered sender (first user) to an identity of a registered recipient (second user), a receiving service for electronic messages to be received, a verification service for the determination and/or verification of recipient addresses, a message service for generating confirmations of delivery and/or confirmations of receipt, an archiving service for archiving messages and/or electronic documents.

By means of this infrastructure, it is guaranteed that the regulations to be complied with for legally binding electronic messages can easily be complied with.

Further, it is advantageous to provide at least one data processing unit for providing services for the secure transmission of electronic messages, by which unit the sending of encrypted and/or signed electronic messages is enabled. Enabling of the sending of the encrypted and/or signed electronic messages can in particular take place dependent on the payment of a fee. Alternatively or additionally, this data processing unit can provide a user administration service for the registration of the users whose user identity is stored in the first and/or the second security module. In this way, a user administration that is independent of the infrastructure can be provided for the secure transmission of the electronic messages according to the invention.

It is particularly advantageous when an identification service for the identification of a user registered in the security module is provided by the first security module and/or by the second security module, wherein the user is identified by means of a user login such as user name and password, a user login with the aid of biometric data of the user which are sensed by means of a biometric sensor, a security module connected via the Internet and/or via a wireless data transmission connection, and/or a chip card. This allows for an easy identification of the user by the security module. After identification of the user and authentication of the user, in particular user information stored in the security module can be used for identifying the user at components of the infrastructure for the legally binding transmission of electronic messages. In this way, an easy and secure identification and authentication of the user is possible both at the security module and the infrastructure for the transmission of electronic messages.

When identifying the first user and/or the second user via the security module of their respective terminal, a mobile transaction number that is transmitted from the infrastructure for the legally binding transmission of electronic messages to the E-Postage provider and from there to the security module can be identified, the first terminal sending a request for sending the mobile transaction number to the infrastructure and a transaction number being generated by a data processing unit of the infrastructure and being transmitted to the E-Postage provider and from there to the security module of the terminal of the user. This provides an easy and efficient possibility of enabling access only for the user who is in possession of the security module to which the transaction number is finally transmitted.

The transmission of the mobile transaction number from the Internet service provider to the E-Postage provider takes place either via a wired link or via a radio network (e.g. GSM, GPRS, UMTS), wherein the E-Postage provider respectively provides one own user account for the first and the second user (A), (B). The transmission of a mobile transaction number from the E-Postage provider to the security module takes place via the encrypted communication channel (50). Here, the information can be transmitted either via a wired link (e.g. Internet) or via a radio network (e.g. GSM, GPRS, UMTS).

Further, it is advantageous when the electronic message is transmitted via a secure data connection to the provider, the secure data connection being established between the respective terminal and the provider. The cryptographically secured identity of the provider is then preferably verified by the first terminal. Preferably, this verification takes place with the aid of a cryptographic certificate that is available to the first terminal. This certificate is preferably stored in a storage area of the first security module. The use of a cryptographic certificate prevents an easy manipulation of the certificate. When high security standards are met, such a certificate only has to be renewed every one to five years, preferably every three years. By using the certificate, it can be verified by the security module whether the secure data connection is actually established to the desired provider or whether the destination address of the provider has been manipulated and another unwanted user has taken the place of the provider, to whom a secure data connection would then be established without verification of the identity of the provider. This prevents that the secure data transmission connection is rerouted to an unwanted user. As a result thereof, the security of the data transmission can be increased and manipulations of the electronic message and unauthorized access to the electronic message are prevented.

Further, it is advantageous when information about the secure identity of the respective security module is requested by the respective terminal and is transmitted from the respective security module to the respective terminal. The respective terminal is then identified at the provider with the aid of this information. In this way, the first terminal can, for example, request information from the first security module about its secure identity, the first security module transmitting this information to the first terminal. Likewise, the second terminal can request information about the secure identity of the second security module from the second security module, which information is then transmitted from the second security module to the second terminal. This allows for an easy identification of the terminal at the provider with the aid of the secure identity of the security module. In particular, for several users several secure identities can be stored in the security module, which identities can then be read out from the security module and transmitted to the respective terminal connected to the security module in the case of a user login of a user for whom information about its secure identity is stored in the security module. With the aid of this information allocated to the user, the terminal can then identify the terminal and/or the user at the provider. In this way, an easy and secure identification of the user and/or the terminal at the provider is possible.

A first user registered in the first security module is preferably a legal person. A second user registered in the first security module is a natural person who after login at the first terminal and/or at the first security module can send a message in the name of the first user in a legally binding manner. In addition, the second user can receive messages for the first user, the security module then decrypting encrypted electronic messages and/or verifying signed electronic messages.

In a further advantageous embodiment of the invention, an account information is stored at least in the first security module. This account information comprises the accessibility of an account storage element which is in particular allocated to a user and/or the security module. From a value stored in the account storage element then a preset amount is deducted when an electronic message is encrypted by the first security module, which message is then sent by means of the first terminal and transmitted to the second terminal by means of the infrastructure. After the deduction of the amount from the stored value, the first security module and/or a central data processing unit can then additionally or alternatively send release information to the provider, which information is necessary so that the provider forwards the message to the recipient. The release information sent to the provider can in particular comprise payment information, dependent on which the provider forwards the electronic message. In this way, an easy payment of the fees charged by the provider for the handling of the electronic message to be sent and of fees charged for the inventive encryption and/or signing is achieved. In particular, no further operating steps of the user are necessary for this.

For the encryption and/or the signing of the electronic message, the first terminal preferably transmits at least the message content, at least one piece of information on the recipient and optionally one of the following information to the first security module:

information as to whether a publicly verifiable signature is required, information as to whether a time stamp is to be generated, the public key of the recipient of the message for encrypting the message content, in particular when the message is to be encrypted, a signature key for signing the message, in particular when the message content is to be signed, information on the accounting mode.

In this way, the security module is easily provided with information on the encryption, the signing and/or the billing of the electronic message.

Further, it is advantageous when a private key of the recipient for encrypting the electronic message and/or a signature key for signing the electronic message is stored in a storage area of the first security module and/or in a storage area of a central data processing unit. The key of the recipient for encrypting the electronic message and/or the signature key can be read out from the central data processing unit. This key or, respectively, these keys are used by the security module to encrypt or, respectively, sign the message. This allows for an easy key administration in the security module itself and/or in the central data processing unit.

Further, it is advantageous when the first security module and/or the second security module are a component integrated into the terminal. This component is preferably connected to further components of the first or, respectively, second terminal via a data bus. Alternatively, the security module can be provided by software executed by the terminal. This offers two advantageous possibilities of providing the security module.

In an embodiment of the invention, information can be transmitted via the respective terminal between the respective security module and a provider who provides at least a part of the infrastructure for the legally binding transmission of legally binding electronic messages. Preferably, no direct data transmission is possible between the security module and the provider. As a result thereof, an additional protection of the security module is achieved as no direct external accesses to the security module are possible. Preferably, between the security module and the respective terminal only a data exchange according to a preset protocol is possible which only provides specific instructions and data exchange steps required for the secure transmission of legally binding electronic messages so that a manipulation of the security module is effectively prevented.

Every service provider who provides the transmission of data at least over a section between the first terminal and the second terminal is regarded as a provider in the sense of the invention. Such providers are in particular Internet service providers, email providers and/or telecommunications providers. These providers in particular provide services and/or infrastructure for the legally binding transmission of messages.

DESCRIPTION OF THE PREFERRED EMBODIMENTS

Figure 1:
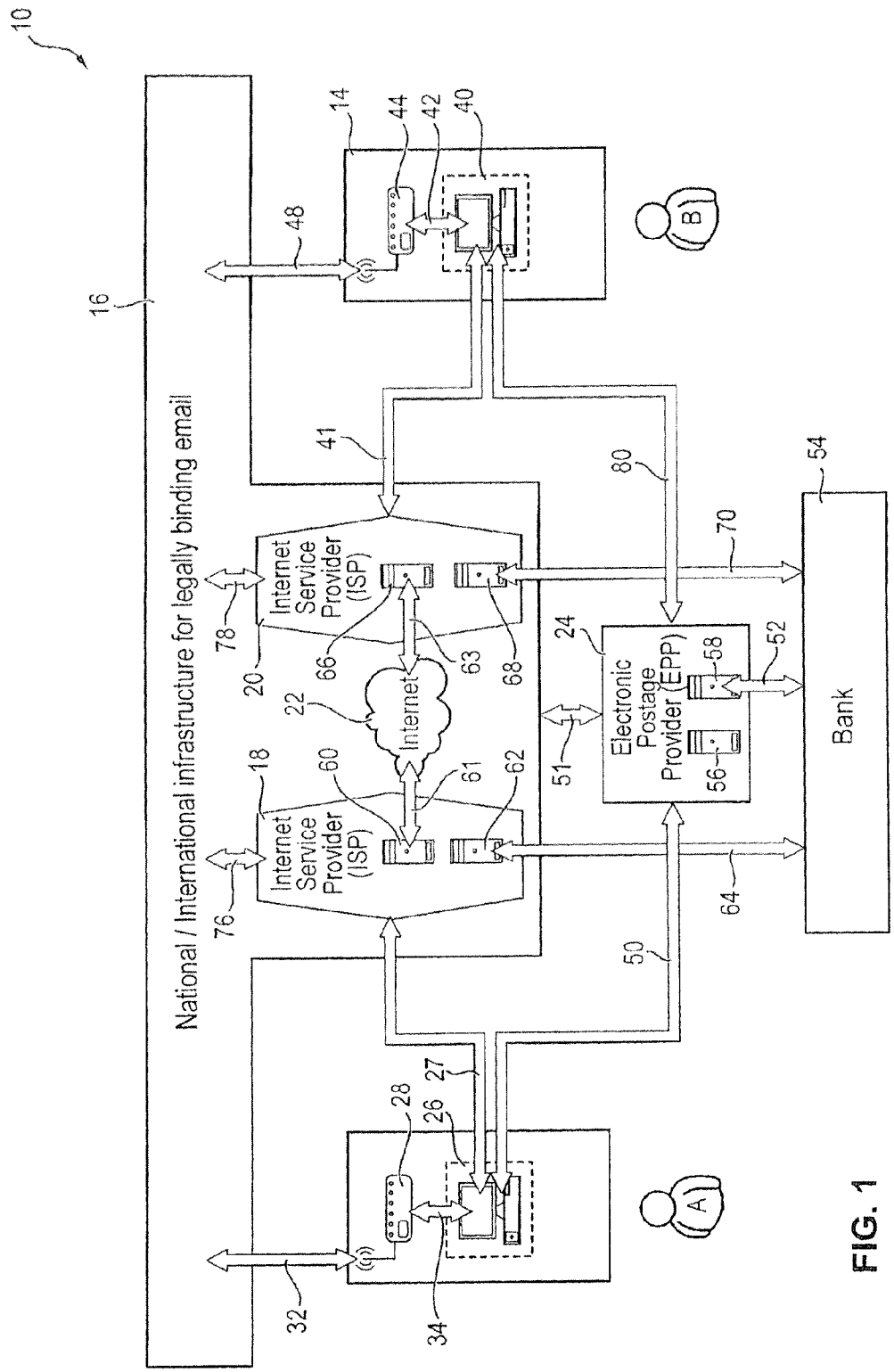
FIG. 1 shows a block diagram of an arrangement for the secure and legally binding transmission of electronic messages between at least two terminals according to a first embodiment of the invention.

In FIG. 1, a block diagram of an arrangement 10 for the secure legally binding transmission of email messages between a first end user system 12 of a user A and a second end user system 14 of a user B is illustrated. In the arrangement 10, a national and/or international infrastructure for legally binding emails is schematically illustrated as a block 16, the services required for this infrastructure 16 being provided by different data processing units, in particular by Internet service providers 18, 20 and/or further data processing systems that can be contacted via the Internet 22. In addition to the infrastructure 16 and the Internet service providers 18, 20, the end user systems 12, 14 are connected via data transmission links 50, 80 to a so-called electronic postage provider (EPP) 24. By the electronic postage provider 24 services are provided which enable and support the secure transmission of legally binding electronic messages, such as email messages. The electronic postage provider 24 is connected via a data transmission link 51 indicated by the arrow to further data processing units (not illustrated) of the infrastructure 16.

The communication between the end user system 12 and the electronic postage provider 24 can in particular take place via the same data line or the same Internet connection of the respective end user system 12 as the connection to the Internet service provider 18, 20. The end user system 12 comprises a personal computer 26 which serves as a terminal for generating email messages, for sending these email messages after generation and for receiving email messages. In connection with the Internet service provider 18 and the further infrastructure 16, it is possible to transmit with the aid of the personal computer 26 legally binding email messages to at least one further end user system 14 and to receive legally binding email messages sent from the further end user system 14. The end user system 12 comprises a security module 28 connected to the personal computer 26 via at least one interface 34, which security module is arranged in a postage meter in the present embodiment. Between the security module 28 and the infrastructure 16, data can be exchanged via the data transmission links 51 and 50, and in particular data with access information and/or authentication information can be transmitted from a service of the infrastructure 16 to the security module 28 via a secure channel. As an alternative to the transmission link 50 in the form of a wired link, also a radio network connection, such as WLAN, GSM, UMTS, can be used. In this case, the security module 28 itself would be equipped with an antenna and a radio network controller.

Between the personal computer 26 and the Internet service provider 18, a data connection can be established via a data transmission link 27, by means of which data connection the personal computer 26 can access the email services of the Internet service provider 18 and the Internet 22. Legally binding email messages to be sent from the personal computer 26 and legally binding email messages to be received by the personal computer 26 are transmitted between the personal computer 26 and the Internet service provider 18 preferably via the data transmission link 27 with the aid of a secure data connection.

The second end user system 14 comprises a personal computer 40 as a second terminal of the arrangement 10 as well as a security module 44 connected to the personal computer 40 via a data interface 42, which security module 44 is arranged in a postage meter, just like the security module 28. Between the security module 44 and the infrastructure 16, data can be exchanged via the data transmission links 51 and 80 and in particular data with access information and/or authentication information can be transmitted from a service of the infrastructure 16 to the security module 44. As an alternative to the wired transmission link 80, also a radio network connection, such as WLAN, UMTS, GSM, can be used. In this case, the security module 40 itself would be equipped with an antenna and a radio network controller.

For the registration of a user A at the personal computer 26 for the sending and/or receiving services for sending and/or receiving legally binding email messages, an authentication request is transmitted from the personal computer 26 via the data connection 27 to the Internet service provider 18 which forwards this request to an authentication service of the infrastructure 16. The infrastructure 16 generates a transaction number and transmits this transaction number via the data transmission links 51 and 50 to the security module 28. After receipt of this transaction number, the security module 28 forwards this transaction number via the interface 34 to the personal computer 26 and in this way registers the user. Alternatively or additionally, the user can log in at the security module 28 in that a biometric characteristic of the user is sensed by means of a biometric sensor. Alternatively or additionally, an authentication of the user can take place by means of a signature read out from a chip card, which signature is read from the chip card by means of a reading unit after insertion of the chip card by the user A and is then used for authentication of the user. The chip card can be read with a reading unit of the personal computer 26 or by means of a reading unit of the security module 28.

Via the data connection 27, a communication interface between the end user system 12 and the Internet service provider 18 is provided, via which sending and receiving of secure legally binding email messages as well as receiving confirmations of delivery and confirmations of receipt, access to a central address directory, a mail box administration and/or an archiving service for email messages and attached documents is possible. The establishment of a secure connection via the data transmission link 27 takes place, for example, by means of a unidirectional software key management on the basis of HTTPS/SSL or TLS. Here, the personal computer 26 verifies in particular the cryptographically secured identity of the Internet service provider 18, for example, via user certificates that are firmly integrated into the software executed by the personal computer 26. The personal computer 26 reads out information about the secure identity of the security module 28 from the security module 28 and identifies itself as the terminal 26 of the user A at the Internet service provider 18 with the aid of this information. Further, the personal computer 26 transmits the data to be encrypted of the legally binding email message to be sent via the interface 34 to the security module 28 which then encrypts and/or signs the data dependent on demand. Dependent on the demand and the payment conditions stored for the respective user A, B, an account in credit administered in the security module 18 by means of an account storage element is debited. The security module 28 in particular provides the following services:
  user identity request,
  encryption of data,
  digital signing of data,
  fee debiting.

Further, a data transmission link 50 is provided between the personal computer 26 and the electronic postage provider 24. The data transmission link 50 can, for example, be provided by a secure data transmission connection via the Internet 22. Via the data transmission link 50, a registration of the security module at the electronic postage provider takes place. This registration is repeated for each new user A, B to be registered at the security module 28. Further, a verification of the identity of the security module 28 takes place via the data transmission link 50 prior to an electronic transaction, i.e. prior to every encryption and/or signing of an email to be sent and prior to the decryption and/or verification of the signature of a received email.

Further, the account in credit of the security module 28 can be loaded via the data transmission link 50 when the electronic postage provider 24 receives payment for the user A or for the security module via a bank interface 52 from a bank 54. The electronic postage provider 24 preferably has at least two data processing units, a first data processing unit 56 for the administration of users and their public keys for the encryption of messages as well as, if applicable, of signature keys, and at least one second data processing unit 58 for fee administration as well as for the administration of accounts in credit of the users A, B or, respectively accounts in credit of the security modules 28, 44. Further, via the data transmission channel 50 further administrative transactions, such as the disabling and enabling of the security module 28, the loading of tariff tables with fees for possible transactions etc. can automatically be implemented.

The establishment of the secure data transmission connection via the data transmission channel 50 takes place, for example, via a bidirectional hardware key management on the basis of the Diffie-Hellmann method. Here, the security module 28 can verify the identity of the electronic postage provider 24. As already mentioned, this can take place via root certificates that are stored in the security module 28 and are preferably only readable. The electronic postage provider 24 can verify the identity of the security module 28 in particular with the aid of a key of the security module 28 stored in a data base of the electronic postage provider 24. For this, several keys can be stored in a key directory which is accessed with the aid of a lightweight directory access protocol (LDAP) (LDAP key directory).

In case the security module of the recipient is designed in the form of software, the sender will preferably use a fresh secret message key to encrypt the message to be sent and to implicitly authenticate it as a result thereof. The used secret message key is directly sent by the sender, for example as an SMS message, to the recipient who enters the key into its software security module.

The Internet service provider 18 has at least two data processing units, in particular a security server 60 and an accounting server 62 for accounting fees charged during handling of legally binding email messages. These are fees which the respective end user A, B has to pay when sending a legally binding email message as well as fees which the service providers 18, 20 charge among each other when sending legally binding email messages.

The accounting server 62 further has a bank interface 64 via which data can be exchanged between the accounting server 62 and the bank 54 or a further bank. As in the case of the first Internet service provider 18, the second Internet service provider 20 has a security server 66 and an accounting server 68. The accounting server 68 is connected to the bank 54 via a bank interface 70 via which data in particular with payment information can be exchanged. Via the bank interfaces 64, 70, the Internet service providers 18, 20 receive information on incoming payments for the user accounts of the users A and/or B and via the bank interface 52 the electronic postage provider 24 receives information on incoming payments for the user accounts of the users A and/or B. The accounting servers 62, 68 of the Internet service providers 18, 20 are connected to the accounting server 58 via a respective data transmission link 72, 74 so that information on incoming payments and/or payments for the user accounts of the users A, B can likewise be transmitted between the accounting server 58 of the electronic postage provider 24 and the accounting servers 62, 68 of the Internet service providers 18, 20.

Further, the Internet service providers 18, 20 are connected via a respective data transmission link 76, 78 to further services of the infrastructure 16 for legally binding email messages. With the aid of these services, in particular a secure data exchange between the Internet service providers 18, 20 is possible so that secure identification information of end users A, B can be queried. Further, by the services of the infrastructure, a registration service for end users can be provided.

The servers 60, 62 of the first Internet service provider 18, the servers 66, 68 of the second Internet service provider 20 and the data processing units 56, 58 of the electronic postage provider 24 are each connected to one another via suitable data transmission connections, like via an internal network. Via the data transmission connections 72, 74, the electronic postage provider 24 receives accounting information for the respective end user A, B from the Internet service providers 18, 20. For settlement of these invoice amounts, the electronic postage provider 24 instructs the bank 54 via the bank interface 64 to credit the invoice amount of the invoice information to the account of the Internet service provider 18, 20. The bank 54 transmits a corresponding payment information via the data transmission channels 64, 70 to the respective Internet service provider 18, 20. Via the bank interface 52, the electronic postage provider 24 receives a message about a payment of the end users A, B to their accounts in credit. The respective credit amounts are then available to the customers in the form of electronic postage for download onto their security module 28, 44 via the data transmission link 50, 80. The communication between the components 40, 44, 46 of the second end user system 14 among each other and with the second Internet service provider as well as with the electronic postage provider 24 takes place in the same manner as described for the components 26, 28, 30, the first Internet service provider 18 and the electronic postage provider 24.

In the following, the operational sequences for message transmission and message processing between the components of the arrangement 10 are described. The personal computer 26 serves as an intermediary between the security module 28 and the Internet service provider 18 so that no direct connection, in particular no online connection can be established between the security module 28 and the security server 60 of the Internet service provider 18. Between the electronic postage provider 24 and each Internet service provider 18, 20 a manually secured transmission of an electronic postage provider verification key takes place. By means of this key, the respective Internet service provider 18, 20 then verifies the certificate chains of all security modules 28, 44.

The registration of a new user C by an Internet service provider 18 can take place as explained in the following. In a first step, the personal computer requests an ID of the security module 28 from the security module 28. Then, the security module 28 sends its ID with several certificates, the first certificate comprising the identity of the security module 24, a time stamp, user data such as company, address, contact and, if used, a mobile transaction number that has been signed by the security module. A further certificate can be a public key certificate of the security module 28 that has previously been certified by the electronic postage provider 24.

The personal computer 26 forwards the ID of the security module 28 together with the certificates to the Internet service provider 18. Given this way of proceeding, the personal computer 26 acted as an intermediary (relay) between the security module 28 and the Internet service provider 18 so that no online connection is required between the security module 28 and the security server 60 of the Internet service provider 18. Preferably, a data transmission protocol is used for the transmission of data between the Internet service provider 18 and the personal computer 26 that is different from the one used for the transmission between the personal computer 26 and the security module 28.

Thereafter, the Internet service provider 18 verifies the ID of the security module 28 for validity, verifies whether the time stamp is current, and verifies the transmitted certificates with the aid of the public key of the electronic postage provider 24. If these verifications are successful, the Internet service provider 18 registers the user C and stores identification features of the user C in connection with the security module 28, in particular in connection with the ID of the security module 28. In this way, a user C is registered at the Internet service provider for legally binding emails and, subsequently, the user can log in at the Internet service provider via the data transmission channel 27 to send and receive legally binding emails, as this will be explained in the following for the user A.

For sending a secure legally binding email message according to the invention, a login of the user A takes place via the personal computer 26 at the Internet service provider 18 and at the electronic postage provider 24. For this, when using a mobile transaction number, a request for a mobile transaction number can be transmitted from the personal computer 26 via the data transmission channel 27 to the Internet service provider 18 which then forwards this request via the data transmission channel 76 to a corresponding service of the infrastructure 16. The mobile transaction number is then generated by this service and transmitted to the security module 28. In the case of a radio network connection to the security module, the transaction number is preferably transmitted to the security module 28 with the aid of the short message service. The data of the email message to be sent including possible attachments are transmitted from the personal computer 26 to the security module 28. Additionally, a recipient ID and/or other information on the recipient are transmitted from the personal computer 26 to the security module 28. Further, information is transmitted as to whether the message content is to be signed with the aid of a publicly verifiable signature. Further, information can be transmitted from the personal computer 26 to the security module 28 as to whether a separate time stamp is requested for the message to be sent. Further, if available, a public key of the recipient of the message is transmitted for encrypting the message content of the email message from the personal computer 26 to the security module 28, as well as information on the accounting mode, i.e. whether the fees to be paid to the electronic postage provider 24 for encrypting and/or signing the message and/or the fees to be paid to the Internet service provider 18 for sending the legally binding email messages are to be paid via accounts in credit at the bank 54 or via accounts in credit at the electronic postage provider 24 and/or at the Internet service provider 18.

When the public key of the message recipient is not transmitted from the personal computer 26 to the security module 28 or for verifying the transmitted public key of the message recipient, a public key of the recipient is read out from the storage area of the security module 28 and/or requested by the security module 28 via the personal computer 26 at the electronic postage provider 24. Upon request of the public key at the electronic postage provider 24, this key is read out from the key server 56 and is transmitted in the personal computer 26 to the security module 28. The security module 28 verifies whether, for the selected accounting mode, sufficient credit balance is available for the user A to pay the fees that incur. If this is not the case, a respective error message is transmitted from the security module 28 to the personal computer 26. If an individual time stamp is requested for the message, this time stamp is attached to the message. If a publicly verifiable signature is necessary, the message content is signed with a secret key, and thereafter, the message including the signature is encrypted with the aid of the public key of the recipient. Alternatively, a symmetric encryption mode with integrity check can be used, and the symmetric session key used thereby can be encrypted with the public key of the recipient. The encrypted message can be preceded by the sender ID. The sender ID is preferably the ID of the security module 28. Alternatively or additionally, also the user ID of the user A can be added.

The fees to be paid for the encryption and/or signature service of the security module 28 are deducted in the security module 28 from a credit balance stored in an account storage element. Thereafter, the encrypted and/or signed message is transmitted from the security module 28 to the personal computer 26. After encrypting and/or signing the message, the security module compiles a correctly formatted email message which contains the message protected between the end user systems 12, 14. For transmitting the message from the first terminal 26 to the Internet service provider 18, the user is logged in at the Internet service provider 18 with the aid of the received mobile transaction number or an alternative identification feature such as a user login by user name and password, an identification by biometric data and/or by a certificate read out from a storage element such as a chip card or a certificate generated by an algorithm. After login, the email message can be transmitted via the data transmission channel 27 from the personal computer 26 to the Internet service provider 18 which then forwards this message to the end user system of the recipient 14. In the present embodiment, the email message is transmitted from the first Internet service provider 18 via the Internet 22 to the second Internet service provider 20 and from there, after a user login via the end user system 14, transmitted to the end user system 14.

For retrieving a received email by the end user system 14 at the Internet service provider 20, a mobile transaction number is requested from a service of the infrastructure 16 in charge thereof via the personal computer 40 and the Internet service provider 20, which transaction number is transmitted to the security module 44. With the aid of this mobile transaction number, the user is preferably logged in at the Internet provider 20 with the aid of user information such a user name already sent when requesting the mobile transaction number. As an alternative to the mobile transaction number, other identification features can be used.

After successful login at the Internet service provider 20, the personal computer 40 retrieves the email message stored at the Internet service provider 20 so that the data of the email message are transmitted from the Internet service provider 20 to the personal computer 40. The encrypted and/or signed email message is transmitted from the personal computer 40 to the security module 44. From the sent email message, the security module 44 determines the recipient ID and determines the private key stored in the security module 44 for the recipient ID and decrypts the email message with the aid of the private key. Alternatively or additionally, a verification of the message content takes place with the aid of a signature verification key of the sender, which key is preferably attached to the message or is obtained from the public key directory of the electronic postage provider 24.

When the message transmitted from the personal computer 40 to the security module 44 contains a publicly verifiable signature, then the public key of the sender is used to verify this public signature. The decrypted message content is provided with additional information as to whether a possibly implemented signature verification or an integrity check had been successful. If the message comprises a time stamp, it is added to the decrypted message. The decrypted message and, if applicable, the additional information are transmitted from the security module 44 to the personal computer 40. The personal computer 40 processes the additional information transmitted from the security module 44 to the personal computer 40 together with the decrypted message and compiles a correctly formatted email message from the decrypted message content, which email message is then available in the personal computer 40. The content of the email message can then in particular be output via a display unit of the personal computer 40. Further, the additional information such as the successful signature verification and a time stamp can be displayed to the recipient B in addition to the message content.

As can be taken from the arrangement 10 according to FIG. 1, the end user systems 12 and 14 are connected to their respective Internet service provider 18, 20 as well as to the central electronic postage provider 24 via similar data transmission channels and interfaces, the end user systems 12, 14 as well as the other components of the arrangement 10 being designed such that secure legally binding email messages can be transmitted both from the end user system 12 to the end user system 14 as well as from the end user system 14 to the end user system 12. The sending of emails from the end user system 14 can take place in the same manner as described for the end user system 12. The receiving of the email messages by means of the end user system 12 takes place in the same manner as described for the end user system 14.

When biometric data are used for identifying a user, biometric data of the user A can be sensed by means of a biometric sensor of the end user system 12 and transmitted to the Internet service provider 18 which compares the transmitted data with stored biometric reference patterns.

Further, a user logged in at the security module 28, can use the user identity of a third user C for sending and receiving secure legally binding emails when the user has been authorized for it by an administrator. This is in particular advantageous when the third user C is a legal person such as a company. Thus, an identification of a user can take place on behalf of a third user. For this, a user identity of the third user C is stored in the security module 28 and can be used by every user A of the personal computer 26 registered in the security module 28 and authorized for sending messages for the third user C or, respectively, for receiving messages for the third user C.

Access to the security module 28 can then be protected by a PIN mechanism (PIN—personal identification number). A system for the verification of the user identity can, for example, comprise a transaction number generator which generates a deterministic sequence of pseudorandom transaction numbers by means of a trapdoor one-way function by using a private key whose public counter-part is stored for verification of the transaction numbers during registration of the security module 28 at the Internet service provider 18.

In the security module, the PINs, the private key as well as the program for calculating the trapdoor one-way function are stored in a non-volatile memory of the security module 28. Apart from the last used transaction number, the trapdoor one-way function also takes into account specific order data, e.g. a hash value, of the message to be transmitted. On the basis of the previous transaction number and the current order data as well as the public key of the security module 28, the Internet service provider 18 verifies for each incoming transaction number whether the current transaction number is valid. Such a way of proceeding is in particular suitable when using the security module 28 in companies in which several employees of the company are authorized for access to the security module 28.

For increasing the security, a time limit for the validity of the identification features of one or of all users can be provided by the security module 28 and/or the Internet service provider 18. Alternatively or additionally, the validity of the identification features of an end user can be limited to a preset number of verification procedures.

Figure 2:
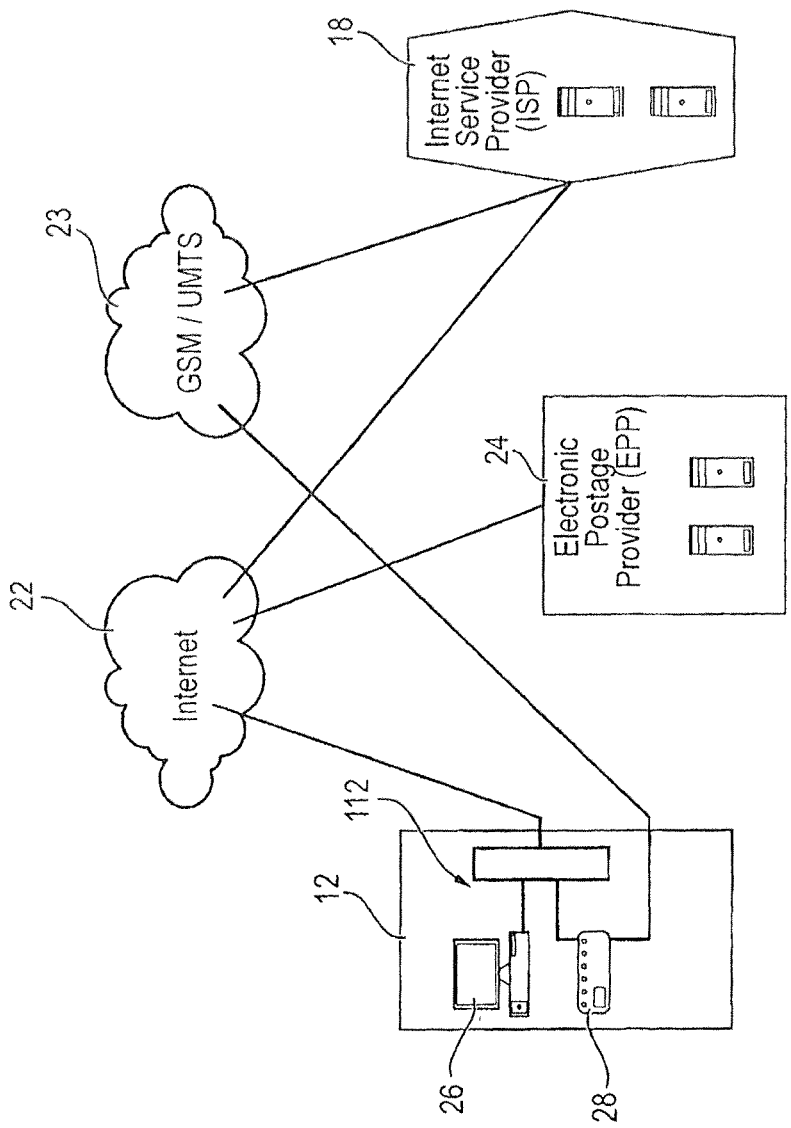
FIG. 2 shows a block diagram with the physical data transmission connections used by the end user system of a user.

FIG. 2 shows a block diagram with the physical data transmission connections used by the end user system 12 of the user A, via which the data transmission channels described in connection with FIG. 1 are established and the described interfaces are provided. The personal computer 26 and the security module 28 of the end user system 12 are connected via an internal network, in particular a local area network (LAN). Via this network, the personal computer 26 has access to the Internet 22. Further, the electronic postage provider 24 and the Internet service provider 18 are connected to the Internet 22 so that a data exchange can take place between the end user system 12, the electronic postage provider 24 and the Internet service provider 18 via the Internet 22.

The Internet service provider 18 is also connected to the telecommunications network 23 so that a mobile transaction number requested by the end user system 12 can be transmitted from the Internet service provider 18 via the electronic postage provider 24 to the security module 28.

Basically, the communication links as well as the establishment of the data transmission channels are always initiated by the end user system 12, preferably only by the terminal 26.

Figure 3:
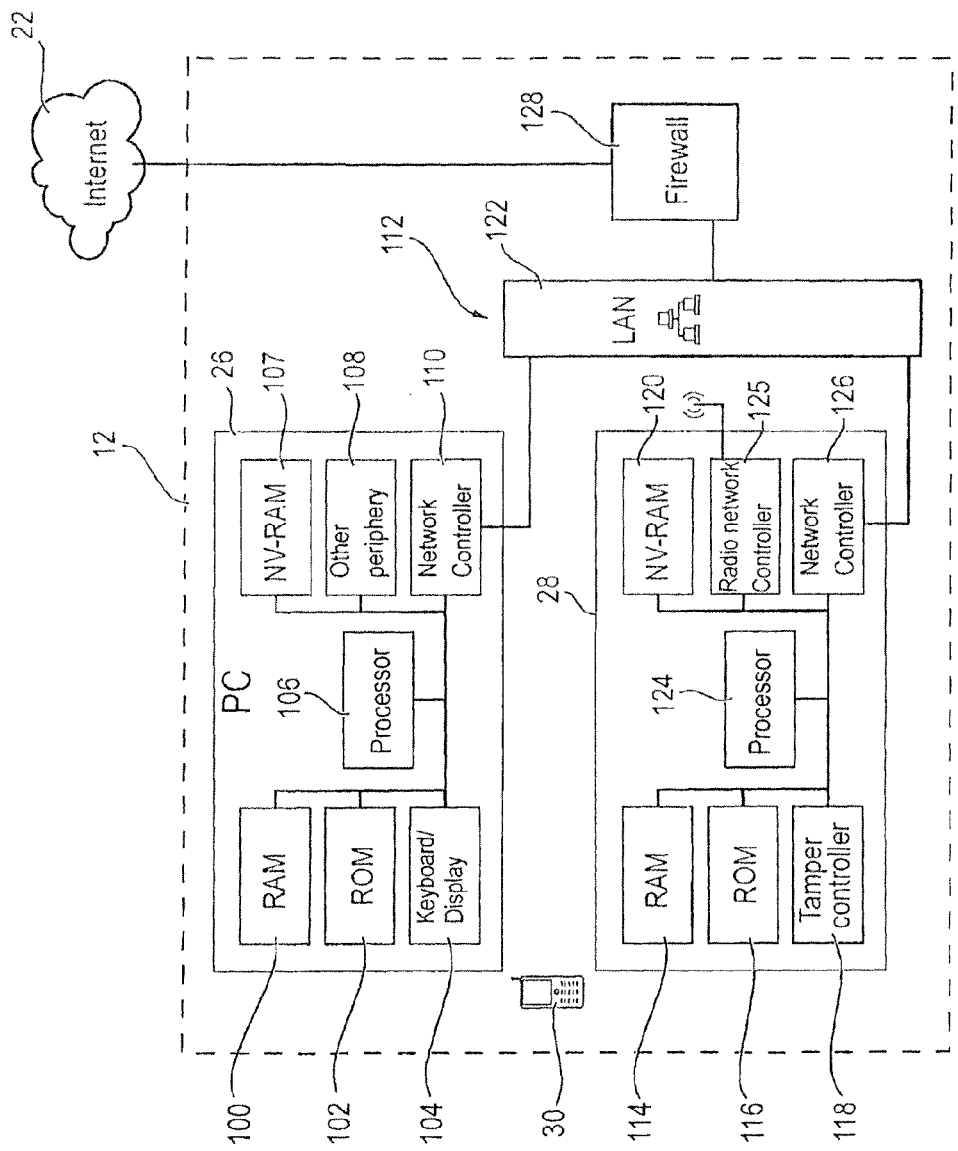
FIG. 3 shows a block diagram with components of the end user system for generating and sending as well as receiving and displaying secure legally binding electronic messages.

In FIG. 3, a block diagram with components of the end user system 12 is shown, The personal computer 26 of the end user system 12 has several components, which comprise a RAM element 100, a ROM element 102, a keyboard and a display 104, a processor 106, an NVRAM element 107, further peripheral devices 108 as well as a network controller 110. The components are connected to one another in the personal computer 26 via respective data lines and bus systems. Via the network controller 110, the personal computer 26 is connected to the internal network 112 of the end user system 12. The security module 28 comprises a RAM element 114, a ROM element 116, a tamper controller 118, an NVRAM element 120 or another non-volatile memory as well as a processor 124 and a network controller 126. Such a tamper controller 118 is an electronic monitoring circuit which detects whenever a small constant current flowing through a conductive meander completely surrounding the security module is interrupted. Such an interruption is considered as a manipulation attempt and results in the active deletion and destruction of the private cryptographic keys of the security module 28 to effectively and immediately prevent that these are spied out.

Via the network controller 126, the security module 28 is connected to the internal network 112. Preferably, the network 112 comprises a network switch 122. Via the internal network 112, a data exchange is possible between the personal computer 26 and the security module 30. Further, a firewall 128 is connected to the internal network 112. Via the firewall 128, a connection can be established from the personal computer 26 to the Internet 22. A data connection from the security module 28 to the Internet 22 and from the Internet 22 to the security module 28 is prevented by the firewall 128.

It is particularly advantageous to design the security module 28, 44 as an independent external device that is connectable to the terminal 26 via a network connection. In the present embodiment, the terminal is designed as a personal computer 26. However, in other embodiments, the terminal can be any arbitrary other data processing device such as a laptop, a mobile phone, in particular a smartphone, a tablet PC or any other arbitrary device with which email messages can be received and/or sent.

As already mentioned, the security module 28 can also be integrated in a postage meter which serves to frank mail. Further, the security module can also be implemented in the personal computer 26 as software.

In particular, a modified Blum Blum Shub generator can be used as a trapdoor one-way function. In this connection, a composite integer of sufficient length, at present of 2048 bit, can be used as a public key. The public key is formed by the equation n=p*q, wherein the factors p and q are prime numbers of approximately the same length (difference in length of about 10 bit), wherein both factors are congruent to 3 (mod 4). The security module 28 calculates the initial state according to the equation $s_0$=t(mod n), wherein t is an arbitrarily chosen number greater than 1 and smaller n. The private key is composed of the number pair p and q. The associated public key which is stored at the Internet service provider 18 and/or at the electronic postage provider 24 comprises $s_0$ and n. For every order i+1, by which, for example, the message m is to be transmitted as an email message, a transaction number generator generates a transaction number $TAN_{i+1}$ and updates its state $s_i$ into $s_{i+1}$ according to the following rule:

$s_{i+1}$←Error! Objects cannot be created from editing field codes.(mod n), wherein $s_i$ designates the internal state of the transaction number generator after the order $_i$ and h designates a one-way hash function that provides values having a constant length of 2048 bit.

Then, the result $s_{i+1}$ is output as $TAN_{i+1}$.

The Internet service provider as verification instance verifies the validity of the transmitted $TAN_{i+1}$ according to the following rule: The $TAN_{i+1}$ is assumed as $s_{i+1}$ for the reconstruction of the internal state of the sender side, wherein the validity is verified according to the following equation $$s_i * h_{2048}(m) = s^2_{i+1} \pmod{n},$$

wherein $s_i$ designates the internal state of the generator after the order i.

In alternative embodiments of the invention, also only one Internet service provider can be provided, which carries out both the communication with the end user system 14 and the end user system 12. As an alternative to an Internet service provider, the function of the provider or, respectively, of the Internet service provider described in the embodiments and in connection with the invention can also be provided by an email service provider which does not allow access to the Internet for the end user system 12, 14. Rather, the final access to the Internet 22 is provided by a separate Internet service provider or another access, and the data transmission via the Internet 22 is used for communication with the email provider. The communication of the components of the end user system 12 with the Internet service provider 18 and with the electronic postage provider 24 as well as with the infrastructure for legally binding email messages has mainly been described for the end user system 12, the Internet service provider 18 and the electronic postage provider 24. The communication of the components of the end user system 14 among each other, between the end user system 14 and the Internet service provider 20 and between the end user system 14 and the electronic postage provider 24 takes place accordingly. When the communication of the end user systems 12, 14 for sending the legally binding email takes place via one provider 18, 20 only, then the encrypted transmission of the legally binding email between the servers 60, 66 of the providers 18, 20 via the Internet 22 can be dispensed with.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for secure transmission of at least one electronic message from a first terminal of a first user to at least one second terminal of a second user comprising:

generating the electronic message at the first terminal;

receiving the electronic message by at least one second terminal, with the electronic message being transmitted by an infrastructure for legally binding transmission of electronic messages from the first terminal to the second terminal;

placing the electronic message in an encrypted form, requiring decryption, using a first security module connected to the first terminal, by at least one of encryption and signing of the electronic message before the electronic message is transmitted by the infrastructure from the first terminal, and then transmitting the electronic message in said encrypted form from said first terminal to a provider and from the provider to the second terminal;

decrypting the encrypted form of the transmitted electronic message by a second security module connected to the second terminal;

in at least one of the first security module and the second security module, identifying a user with a user login registered in the respective first or second security module thereof, and requiring a successful user login before permitting at least one of said placing of the electronic message in encrypted form and said decrypting the encrypted form of the transmitted message; and via the infrastructure for legally binding electronic messages, implementing a registration service for new users, an authentication service for registered users, a sending service for electronic messages to be sent, a receiving service for electronic messages to be received, and a verification service for at least one of determining and verifying recipient addresses.

2. The method according to claim 1, comprising connecting the first security module to the first terminal via a first data line and connecting the second security module to the second terminal via a second data line.

3. The method according to claim 2, comprising forming each of the first data line and the second data line by a transmission channel in a network.

4. The method according to claim 2, comprising forming the first data line by at least one of a bus system of the first terminal and a standardized application interface, and forming the second data line by at least one of a bus system of the second terminal and a standardized application interface.

5. The method according to claim 1, comprising, via the infrastructure for legally binding electronic messages, also implementing at least one service selected from the group consisting of:

message service for generating confirmations of delivery and/or confirmations of receipt, and an archiving service for archiving messages and/or documents.

6. The method according to claim 1, comprising providing at least one data processing unit configured to provide services for the secure transmission of electronic messages and, via said data processing unit, enabling at least one of transmission of the electronic message placed in encrypted form, and providing a user administration service for the registration of the users and storing user identities of the users in the first security module or the second security module.

7. The method according to claim 1, comprising transmitting the electronic message by the infrastructure via a secure data connection to the provider, and verifying the cryptographically secured identity of the provider by the first terminal.

8. The method according to claim 1, comprising, from one of said first and second terminals, requesting information about the secure identity of the security module at the other of the first and second terminals, and transmitting the requested information from the respective security module to the requesting terminal, and identifying the respective terminal at the provider using the requested information.

9. The method according to claim 1, comprising storing, at least in the first security module, account information, with which a value is determined from which an amount is deducted when an electronic message is encrypted by the first security module, after which the message is then sent by the first terminal and transmitted to the second terminal by the infrastructure.

10. The method according to claim 1, comprising, from the first terminal transmitting at least one item to the first security module for placing the electronic message in said encrypted form, selected from the group consisting of:

message content, information on the recipient, information as to whether a publicly verifiable signature is required, information as to whether a time stamp is to be generated, the public key of the recipient of the message for encrypting the message content, a signature key for signing the content of the message, and information on the accounting mode.

11. The method according to claim 1, comprising storing a private key of the recipient for placing the electronic message in said encrypted form, in at least one of a storage area of the first security module and a storage area of a central data processing unit, from which at least one key for placing the electronic message in said encryption form is read out, and, in the first security module using the key the electronic message in said encrypted form.

12. The method as claimed in claim 1 wherein said provider is a first provider and wherein said first security module places said electronic message in said encrypted form in a first encryption operation, and comprising:

further encrypting said electronic message in said encrypted form at said first provider by implementing a second encryption operation, thereby producing a further encrypted electronic message;

transmitting said further encrypted electronic message from said first provider to a second provider;

decrypting said further encryption of said further encrypted electronic message at said second provider, while still leaving said electronic message placed in said encrypted form; and transmitting the electronic message in said encrypted form from said second provider to said second terminal.

13. The method according to claim 1 comprising integrating said first security module into said first terminal in a form selected from the group consisting of a hardware component and a software module.

14. The method according to claim 1 comprising integrating said second security module into said second terminal in a form selected from the group consisting of a hardware component and a software module.

15. The method as claimed in claim 1 comprising, via said provider, providing at least a part of said infrastructure, and precluding direct data transmission between each of said first and second security modules and said provider, other than use of said part of said infrastructure.

16. An arrangement for secure transmission of at least one electronic message from a first terminal of a first user to at least one second terminal of a second user, comprising:
   said first terminal being configured to generate the electronic message;
   the at least one second terminal being configured to receive the electronic message;
   an infrastructure configured for legally binding transmission of the electronic message from the first terminal to the second terminal;
   a first security module connected to the first terminal, configured to place the electronic message in an encrypted form, requiring decryption, by at least one of encryption and signing of the electronic message, and then to transmit the electronic message in said encrypted form via the infrastructure from the first terminal to a provider, and then from the provider to the second terminal;
   a second security module connected to the second terminal, said second security module being configured to decrypt the encrypted form of the electronic message;
   at least one of the first security module and the second security module being configured to a user registered with a user login in the respective first or second security module thereof, and to require a successful user login before permitting at least one of said placing of the electronic message in encrypted form and said decrypting the encrypted form of the transmitted message; and
   said infrastructure for legally binding electronic messages being configured to implement a registration service for new users, an authentication service for registered users, a sending service for electronic messages to be sent, a receiving service for electronic messages to be received, and a verification service for at least one of determining and verifying recipient addresses.

17. The arrangement as claimed in claim 16, wherein said provider is a first provider, and wherein:
   said first security module is configured to place said electronic message in said encrypted form in a first encryption operation;
   said first provider is configured to further encrypt said electronic message in said encrypted form by implementing a second encryption operation, thereby producing a further encrypted electronic message;
   said first provider is configured to transmit said further encrypted electronic message from said first provider to a second provider;
   said second provider is configured to decrypt said further encryption of said further encrypted electronic message at said second provider, while still leaving said electronic message placed in said encrypted form; and
   said second provider is configured to transmit the electronic message in said encrypted form from said second provider to said second terminal.

* * * * *